United States Patent [19]

Ohgami

[11] Patent Number: 4,680,990
[45] Date of Patent: Jul. 21, 1987

[54] SYSTEM FOR CONTROLLING THE TRANSMISSION RATIO OF AN INFINITELY VARIABLE TRANSMISSION

[75] Inventor: Masaaki Ohgami, Musashino, Japan

[73] Assignees: Fuji Jukogyo Kabushiki Kaisha, Tokyo, Japan; Van Doorne's Transmissie B. V., Tilburg, Netherlands

[21] Appl. No.: 722,961

[22] Filed: Apr. 12, 1985

[30] Foreign Application Priority Data

Apr. 19, 1984 [JP] Japan .................. 59-79746

[51] Int. Cl.⁴ .................................. B60K 41/16
[52] U.S. Cl. ........................ 74/868; 74/866; 74/877; 192/3.56
[58] Field of Search ............... 74/877, 865, 866, 867, 74/868; 192/3.56

[56] References Cited

U.S. PATENT DOCUMENTS

| | | | |
|---|---|---|---|
| 4,387,608 | 6/1983 | Mohl et al. | 74/866 |
| 4,438,664 | 3/1984 | Fiala | 74/877 X |
| 4,457,411 | 7/1984 | Hiramatsu | 192/3.56 X |
| 4,458,318 | 7/1984 | Smit et al. | 74/866 X |
| 4,459,879 | 7/1984 | Miki et al. | 74/866 X |
| 4,462,275 | 7/1984 | Mohl et al. | 74/866 |
| 4,484,672 | 11/1984 | Takano et al. | 192/3.56 |
| 4,534,243 | 8/1985 | Yokoyama et al. | 474/28 X |
| 4,546,673 | 10/1985 | Shigematsu et al. | 74/866 |
| 4,547,178 | 10/1985 | Hayakawa et al. | 474/28 X |

FOREIGN PATENT DOCUMENTS

| | | | |
|---|---|---|---|
| 0093312 | 11/1983 | European Pat. Off. | 74/866 |
| 3139838 | 4/1983 | Fed. Rep. of Germany | 74/866 |
| 56-83646 | 7/1981 | Japan | 74/877 |
| 58-146750 | 9/1983 | Japan | 74/866 |

*Primary Examiner*—Leslie Braun
*Assistant Examiner*—Dwight G. Diehl
*Attorney, Agent, or Firm*—Martin A. Farber

[57] ABSTRACT

An infinitely variable transmission has a primary pulley having a hydraulically shiftable disc and a hydraulic cylinder for operating the disc, a secondary pulley having a hydraulically shiftable disc and a hydraulic cylinder for operating the disc, and a belt engaged with both pulleys. A hydraulic circuit having a transmission ratio control valve is provided for shifting the disc of the primary pulley in the downshift direction and upshift direction. The transmission ratio control valve is operated to shift the disc of the primary pulley in the downshift direction when the throttle valve of the engine is rapidly opened for accelerating the engine.

3 Claims, 13 Drawing Figures

V (VEHICLE SPEED)

N (SPEED OF PRIMARY PULLEY)

SYSTEM FOR CONTROLLING THE TRANSMISSION RATIO OF AN INFINITELY VARIABLE TRANSMISSION

BACKGROUND OF THE INVENTION

The present invention relates to a system for controlling the transmission ratio of an infinitely variable transmission for a vehicle, and more particularly to a system for increasing the transmission ratio at rapid acceleration.

An infinitely variable belt-drive transmission comprises an endless belt running over a primary pulley and a secondary pulley. Each pulley comprises a movable conical disc which is axially moved by a pressure oil servo device so as to vary the running diameter of the belt on the pulley depending on driving conditions. The system is provided with an oil pressure regulator valve and a transmission ratio control valve. Each valve comprises a spool which controls the pressure of the oil by shifting the spool.

The primary pulley has a Pitot pressure generating device for producing Pitot pressure dependent on engine speed. The Pitot pressure is applied to one axial end of the spool of each valve to bias the spool. On the other hand, the actual transmission ratio is detected by the axial position of the movable conical disc of the primary pulley which represents the running diameter of the belt on the primary pulley. The position of the movable conical disc is transmitted to the other axial end of the spool of the pressure regulator valve. Further, intake manifold pressure of the engine is applied to the other axial end of the spool of the transmission ratio control valve through a vacuum operated actuator so as to control the transmission ratio. Since the conventional control system comprises various mechanical devices, the construction is very complicated. In addition, the Pitot pressure increases like a curve of the second degree with an increase in the engine speed. Accordingly, it is difficult to exactly control the transmission ratio in a low engine speed range. Further, the intake manifold pressure also changes like a curve of the second degree with a change in the opening degree of the throttle valve of the engine. Therefore, the control operation at high engine speed can not be properly controlled. In addition, the characteristics of signals representing engine speed, manifold vacuum and pulley transmission ratio are roughly determined in accordance with engine operating conditions and cannot be corrected in dependency on various driving conditions of a vehicle.

SUMMARY OF THE INVENTION

The object of the present invention is to provide a transmission ratio control system which can improve the acceleration characteristic at rapid acceleration. The control system of the present invention comprises an electromagnetic clutch for transmitting the power of an engine to an infinitely variable transmission and a pressure oil control system.

The transmission comprises a primary pulley having a hydraulically shiftable disc and a hydraulic cylinder for shifting the disc, a secondary pulley having a hydraulically shiftable disc and a hydraulic cylinder for operating the disc, and a belt engaged with both pulleys. The system further comprises a hydraulic circuit having a transmission ratio control valve comprising a spool for selectively shifting the disc of the primary pulley in the downshift direction and upshift direction, means for detecting the throttle position and for producing a first signal, second means responsive to the first signal for producing a second signal representing the opening speed of the throttle valve of the engine, and third means responsive to the first and second signal for shifting the spool of the transmission ratio control valve in the downshift direction.

BRIEF DESCRIPTION OF DRAWINGS

The other objects and features of this invention will become understood from the following description with reference to the accompanying drawings.

DETAILED DESCRIPTION OF THE PREFERRED EMBODIMENT

Figure 1:
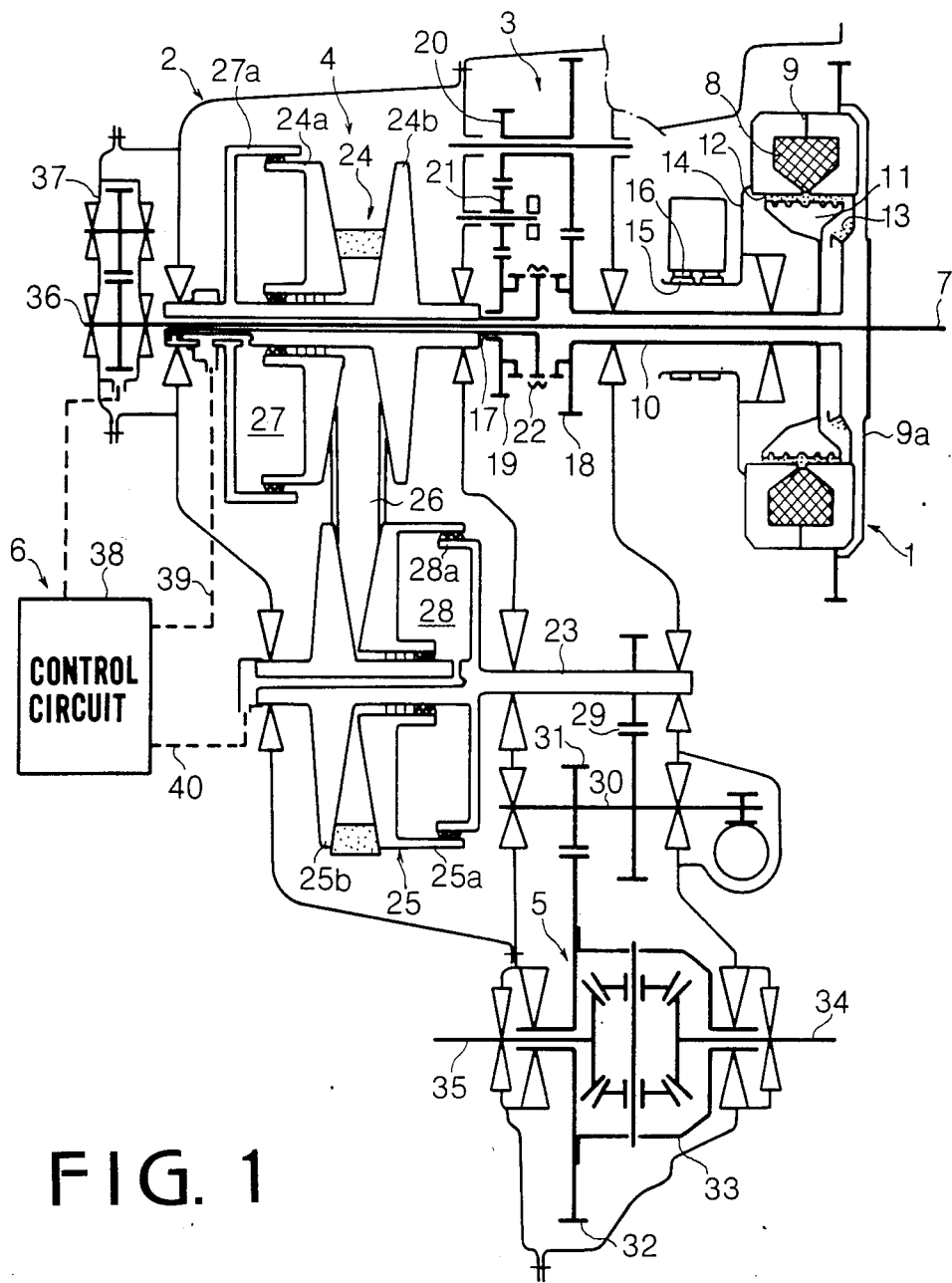
FIG. 1 is a schematic illustration of an infinitely variable belt-drive transmission employed in a control system according to the present invention.

Referring to FIG. 1, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, a final reduction device 5, and a pressure oil control section 6. A crankshaft 7 of an engine (not shown) is connected to an annular drive member 9 through a drive plate 9a of the electromagnetic powder clutch 1. The electromagnetic powder clutch further comprises a driven member 11 and a magnetizing coil 8 provided in the drive member 9. The driven member 11 has its outer periphery spaced from the inner periphery of the drive member 9 by a gap 12, and a powder chamber 13 is defined between the drive member 9 and the driven member 11. The powder chamber 13 is filled with powder of magnetic material. The driven member 11 is secured to an input shaft 10 of the belt-drive transmission. A holder 14 secured to the drive member 9 carries slip rings 15 which are electrically connected to the coil 8. The coil 8 is supplied through brushes 16 and slip rings 15 with current from a control circuit for the electromagnetic powder clutch.

When the magnetizing coil 8 is excited by clutch current, the drive member 9 is magnetized to produce a magnetic flux passing through the drive member 11. The magnetic powder is aggregated in the gap 12 by the magnetic flux and the driven member 11 is engaged with the drive member 9 by the powder. On the other hand, when the clutch current is cut off, the drive and driven members 9 and 11 are disengaged from one another.

In the belt-drive transmission 2, the selector device 3 is provided between the input shaft 10 and a main shaft 17. The main shaft 17 is cylindrical and is disposed coaxially with the input shaft 10. The selector device 3 comprises a drive gear 18 integral with the input shaft 10, a reverse driven gear 19 rotatably mounted on the main shaft 17, and a synchronizer 22 mounted on the main shaft 17. The drive gear 18 meshes with one gear of a counter gear 20. Another gear of the counter gear 20 engages with an idler gear 21, which in turn engages with the driven gear 19.

The synchronizer 22 has a well-known mechanism and comprises a hub secured to the main shaft 17, and a synchronizer sleeve slidably engaged to the hub with splines. The synchronizer sleeve is adapted to engage with splines of the drive gear 18 or with splines of driven gear 19.

At a neutral position (N range) of a selector lever (not shown), the synchronizer 22 does not engage either gear, so that the main shaft 17 is disconnected from the input shaft 10. When the synchronizer is engaged with the gear 18, the input shaft 10 is connected to the main shaft 17 through the synchronizer to provide a driving position (D range).

When the synchronizer is engaged with the gear 19, the input shaft 10 is connected to the main shaft 17 through the gears 18, 20, 21 and 19 to provide a reverse driving position (R range).

The main shaft 17 has an axial passage in which an oil pump driving shaft 36 connected to the crankshaft 7 is mounted. An output shaft 23 is provided parallel to the main shaft 17. A primary pulley 24 and a secondary pulley 25 are mounted on the shafts 17 and 23. A fixed conical disc 24b of the primary pulley 24 is integral with the main shaft 17 and an axially movable conical disc 24a is axially slidably mounted on the main shaft 17. The movable conical disc 24a also slides in a cylinder 27a formed on the main shaft 17 to provide a servo device 27. A chamber of the servo device 27 communicates with a gear pump 37 through a pressure oil control circuit 38. The gear pump 37 is driven by the shaft 36.

A fixed conical disc 25b of the secondary pulley 25 is formed on the output shaft 23 opposite the movable disc 24a and a movable conical disc 25a is slidably mounted on the shaft 23 opposite the disc 24b. The movable conical disc 25a has a cylindrical portion in which a piston portion 28a of the output shaft 23 is slidably engaged to form a servo device 28. A chamber of the servo device 28 is communicated with the oil pump 37 through the pressure oil control circuit 38. A drive belt 26 engages the primary pulley 24 and the secondary pulley 25.

Secured to the output shaft 23 is a drive gear 29 which engages with an intermediate reduction gear on an intermediate shaft 30. An intermediate gear 31 on the shaft 30 engages with a final gear 32. Rotation of the final gear 32 is transmitted to axles 34 and 35 of the vehicle driving wheels of the vehicle through a differential 33.

The pressure oil control circuit 38 is responsive to vehicle speed, engine speed and throttle valve position for controlling the pressure oil supply to the servo devices 27 and 28 thereby moving discs 24a and 25a. Thus, transmission ratio is infinitely changed.

Figure 2:
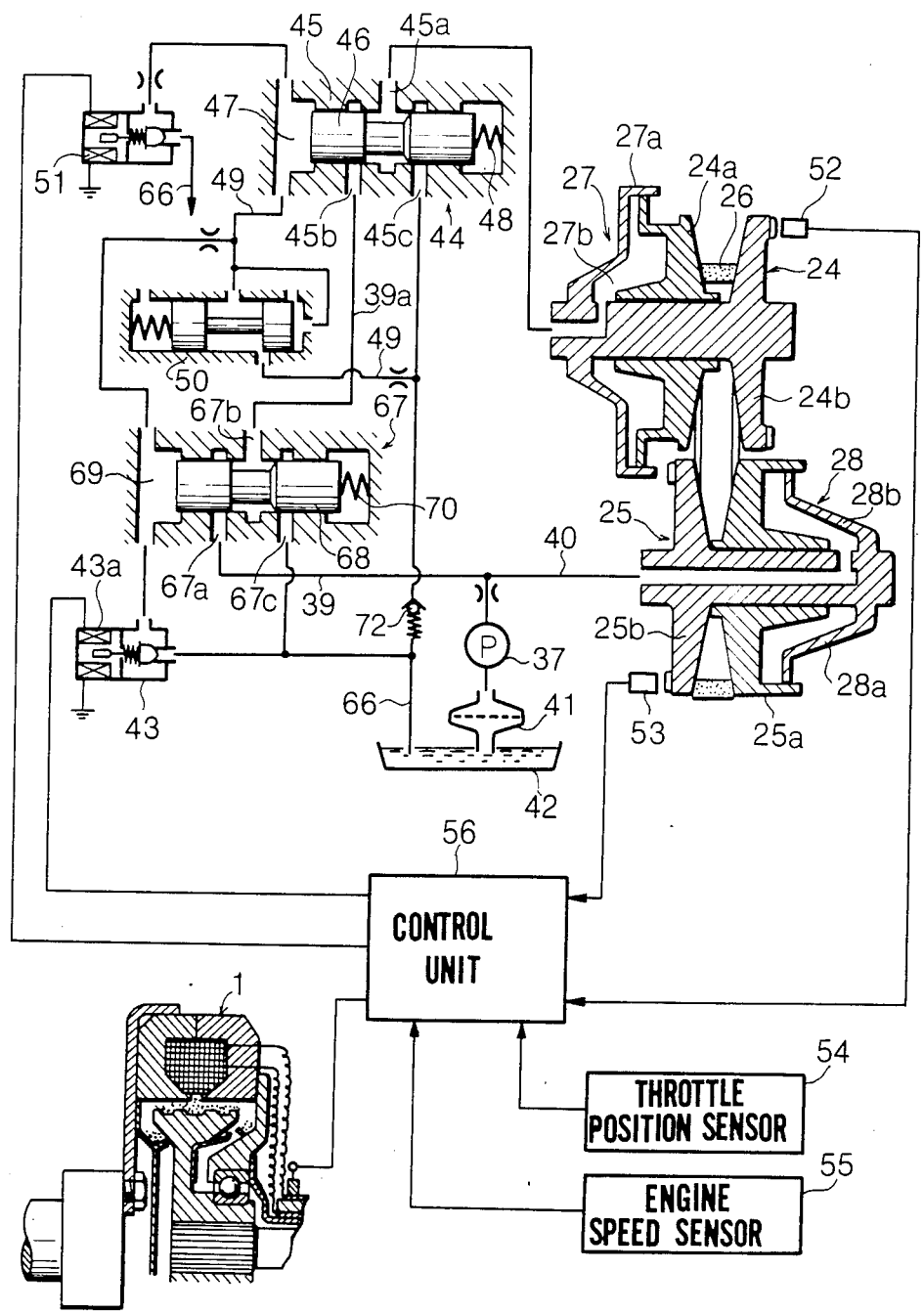
FIG. 2 is a schematic diagram showing a control system of the transmission according to the present invention.

Referring to FIG. 2, a chamber 27b of the servo device 27 is applied with pressurized oil by the gear pump 37 from an oil reservoir 42 passing through a filter 41, a conduit 39, a pressurized regulator valve 67, a conduit 39a and a transmission ratio control valve 44. A chamber 28b of the servo device 28 is applied with pressure oil through a conduit 40 without passing the valves 67 and 44. The movable conical disc 24a is so designed that its pressure receiving area is larger than that of the movable conical disc 25a.

The pressure regulator valve 67 has a spool 68, an end chamber 69 and a spring 70 provided opposite the end chamber 69. The spring 70 urges the spool 68 to the left to communicate a port 67a with a line pressure supply port 67b and the pressure of the oil supplied to the chamber 69 urges the spool 68 to the right to communicate the port 67b with a drain port 67c, so as to regulate the line pressure in the passages 39, 39a.

The transmission ratio control valve 44 comprises a spool 46 in a valve body 45, a chamber 47 and a spring 48 opposite the chamber 47. The spring 48 urges the spool 46 to the left to communicate a line pressure supply port 45b from the conduit 39a with a port 45a and the pressure of oil supplied to the chamber 47 urges the spool to the right to communicate the port 45a with a drain port 45c. The drain port 45c is communicated with the oil reservoir 42 through a drain passage 66 and a check valve 72, and the drain port 67c is directly communicated with the reservoir 42. Further, the drain port 45c is communicated with chambers 69 and 47 through a passage 49 and a regulator valve 50 which regulates the pressure of the oil to a constant pressure. The chamber 69 is communicated with the oil reservoir 42 through a solenoid operated valve 43 and the drain passage 66, and the chamber 47 is also communicated with the reservoir 42 through a solenoid operated valve 51 and the drain passage 66.

A primary pulley speed sensor 52 and secondary pulley speed sensor 53 are provided to detect the speed of the primary pulley 24 and secondary pulley 25, respectively. The system is further provided with a throttle position sensor 54 and an engine speed sensor 55. Outputs from these sensors 52 to 55 are applied to a control unit 56 to control the solenoid operated valves 43 and 51.

Figure 3A:
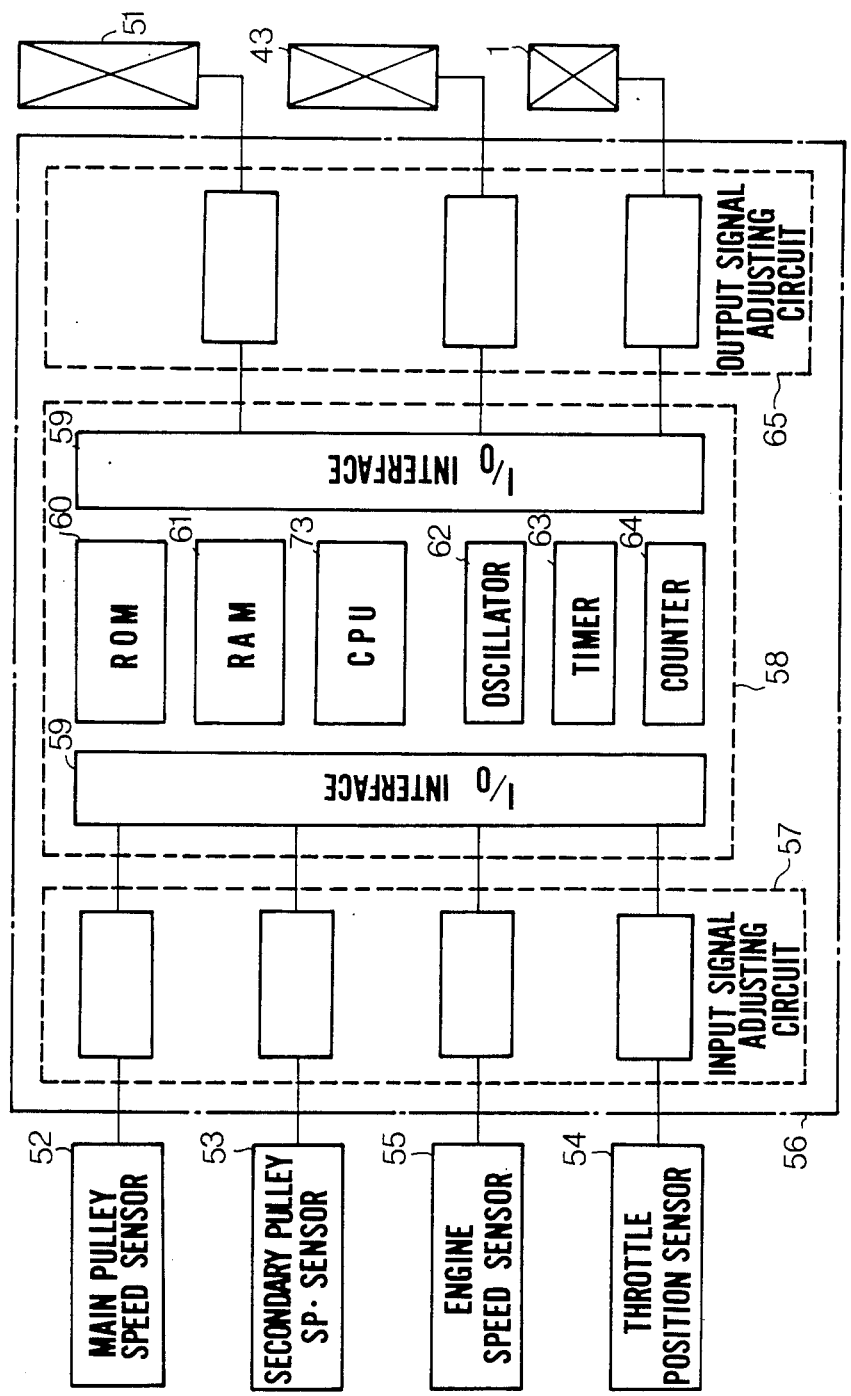
FIGS. 3a and 3b are block diagrams showing a control unit of the present invention.

Referring to FIG. 3a showing the control unit 56, the outputs of the of sensors 52 to 55 are applied to a microcomputer 58 through input signal adjusting circuits 57. The microcomputer comprises an input-output (I/O) interface 59, a ROM 60 in which various table maps are stored, a RAM 61 storing signals from the sensors, a CPU 73, an oscillator 62, a timer 63 and a counter 64. Output signals from the I/O interface 59 are applied to the solenoid-operated valves 43 and 51 and the electromagnetic clutch 1 through output signal adjusting circuits 65.

Figure 3B:
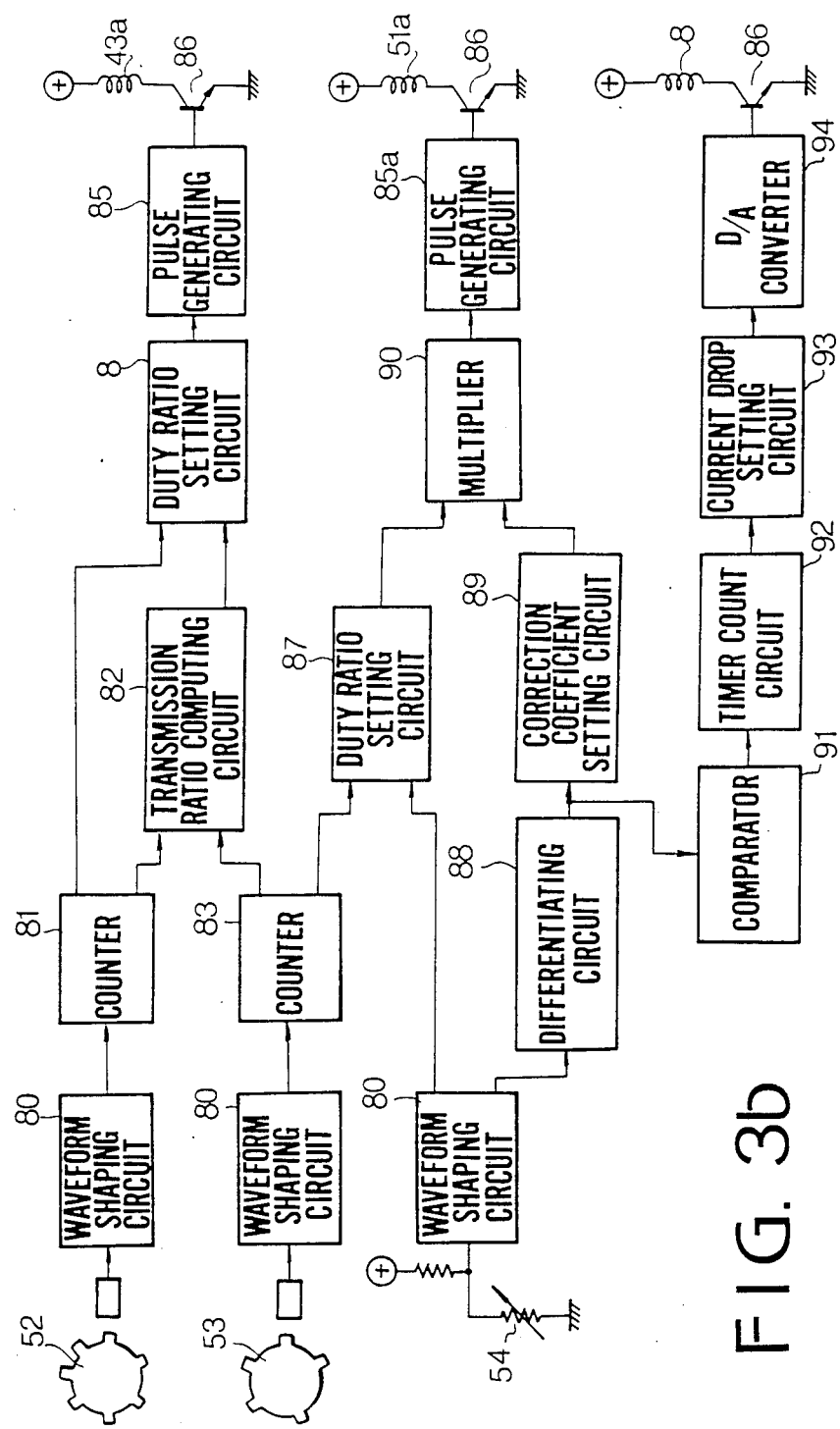
Figure 4A:
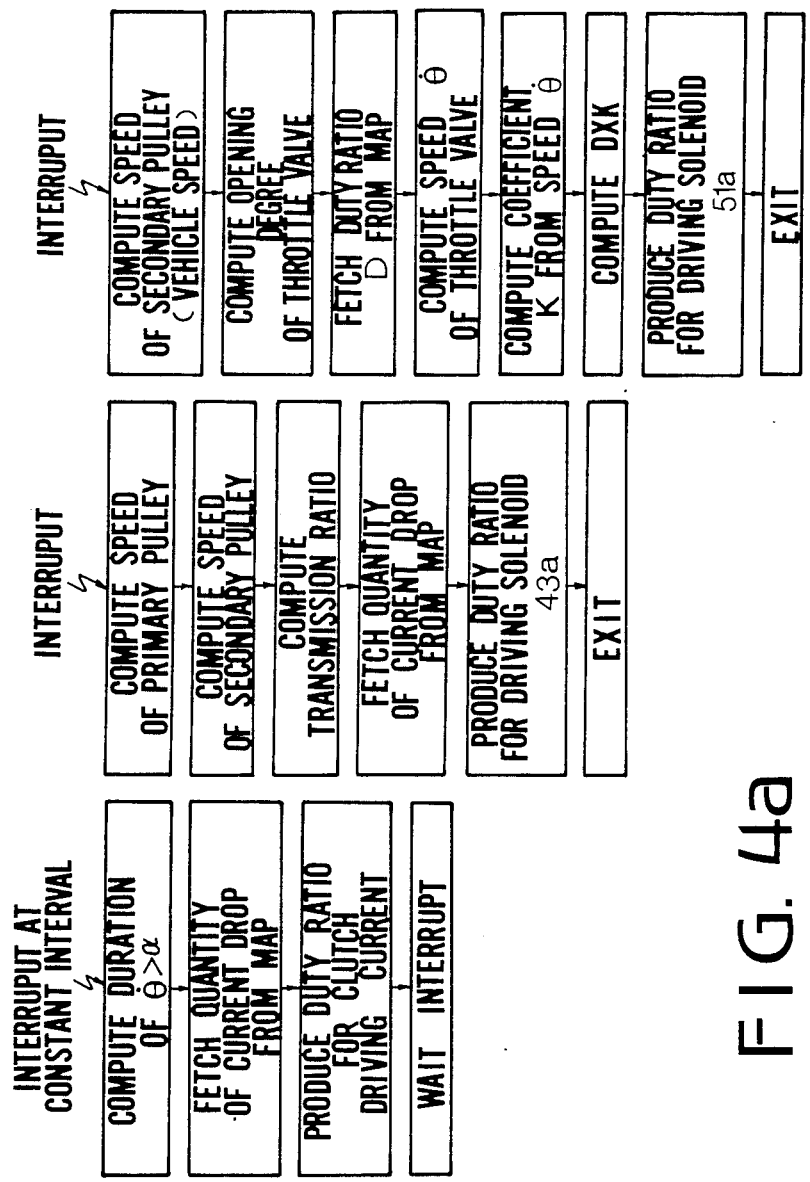
FIGS. 4a to 4e are flow charts and maps for explaining the operation of the system.
Figure 4B:
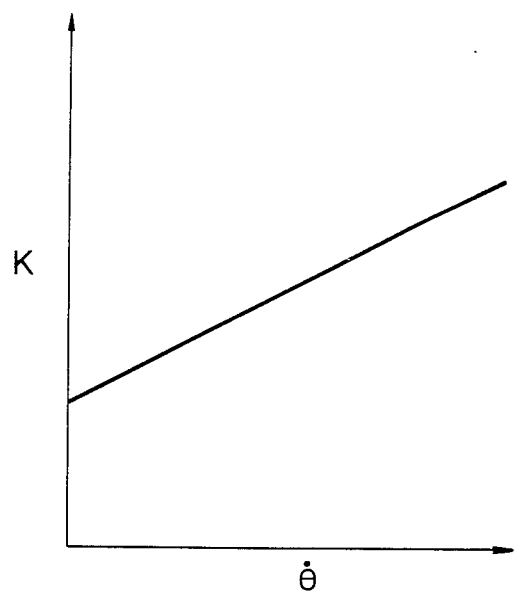
Figure 4C:
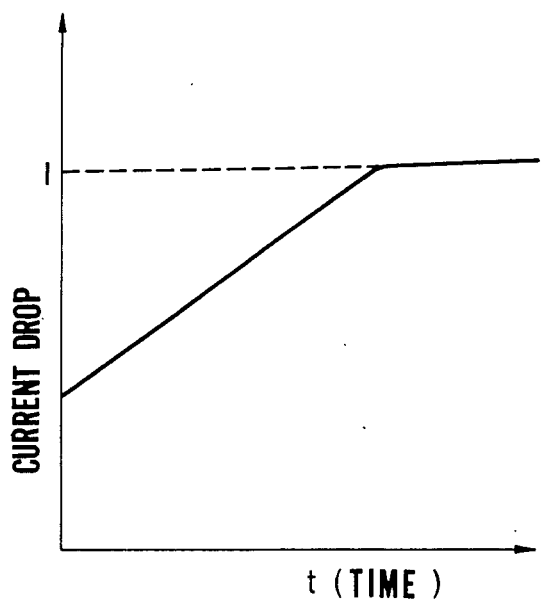
Figure 4D:
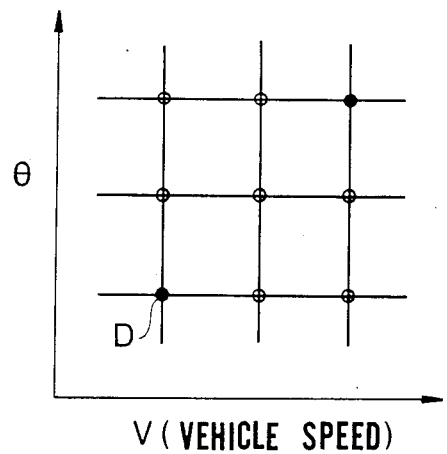
Figure 4E:
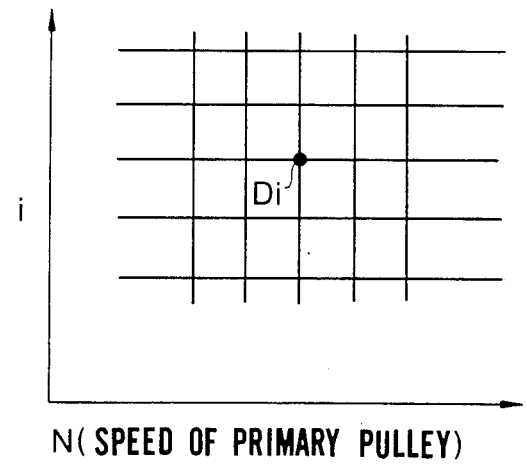

FIG. 3b is a block diagram showing another example of the control unit 56. Output pulses from the primary pulley speed sensor 52 are shaped by a waveform shaping circuit 80 and counted by a counter 81. Output pulses from the secondary pulley speed sensor 53 are applied to a counter 83 through the waveform shaping circuit 80. Outputs from the counters 81 and 83 are applied to a transmission ratio computing circuit 82 to compute the transmission ratio. The output from the counter 81 and the output from the computing circuit 82 are applied to a duty ratio setting circuit 84, output from which is applied to a pulse generating circuit 85. The circuit 85 produces pulses having a duty ratio dependent on the output of the circuit 84. The output from the circuit 85 operate a transistor 86 to excite a solenoid 43a of the solenoid operated valve 43 for the pressure regulator valve 67 at the duty ratio. The output from the throttle position sensor 54 is applied to a duty ratio setting circuit 87 through a waveform shaping circuit 80, and the output from the counter 83 is also applied to the circuit 87 so as to set a duty ratio for the solenoid operator valve 51. On the other hand, the output from the waveform shaping circuit 80 is applied to a differentiating circuit 88, so that the opening speed of the throttle valve of the engine is obtained by differentiating the output. The output from the differentiating circuit 88 is applied to a correction coefficient setting circuit 89 which produces a correction coefficient dependent on the throttle valve opening speed. Outputs from the duty ratio setting circuit 87 and the correction coefficient setting circuit 89 are applied to a multiplier 90 which produces a duty ratio signal corrected by the correction coefficient. A pulse generating circuit 85a produces pulses having a duty ratio dependent on the duty ratio signal from the multiplier 90. The pulses operate a transistor 86 which excites a solenoid 51a of the solenoid operated valve 51 for the transmission ratio control valve 44.

Further, the output of the differentiating circuit 88 is applied to a comparator 91 at which the output is compared with a reference value. An output signal from the comparator 91 is applied to a current drop setting circuit 93 through a timer count circuit 92. The output from the current drop setting circuit 93 is applied to a transistor 86 through a D/A converter 94 to control the current passing through the coil 8 of the electromagnetic powder clutch 1.

Explaining the operation of the control system, the solenoid operated valve 43 is intermittently opened at a duty ratio which is determined by the transmission ratio and the speed of the primary pulley 24 as described above. The operation of the solenoid operated valve 43 acts to regulate the pressure in the chamber 69 of the pressure regulator valve 67 to control the line pressure in passages 39 and 39a. The line pressure is raised as the transmission ratio or the engine speed increases, so that the movable conical disc 24a is pressed against the belt 26 at high pressure. Thus, the belt transmits the power to the secondary pulley 28 without slipping a high transmission ratio or high engine speed.

On the other hand, the solenoid operated valve 51 is operated at a duty ratio dependent on the transmission ratio which is corrected by the speed of the throttle valve when opened. The operation of the valve 51 controls the pressure in the chamber 47 of the transmission ratio control valve 44 to control the amount of pressurized oil supplied to the chamber 27b of the servo device 27. The pressure in the chamber 47 increases with an increase in the opening degree of the throttle valve, so that the amount of oil discharged from the chamber 27 increases. Thus, the transmission ratio increases with an increase in the opening degree of the throttle valve.

The control operation by the microcomputer will be described hereinafter with reference to FIGS. 4a to 4e. When the accelerator pedal is depressed in order to accelerate the vehicle, a duty ratio D is fetched from a map of FIG. 4d depending on the vehicle speed (speed of the secondary pulley) and the opening degree θ of the throttle valve. A correction coefficient K is obtained from a graph of FIG. 4b in accordance with the throttle valve opening speed θ. The duty ratio D is multiplied by the coefficient K to obtain a duty ratio signal for the transmission ratio which is applied to the solenoid operated valve 51. A duty ratio Di is fetched from a map of FIG. 4e depending on the speed of the primary pulley N and transmission ratio (i) which is obtained from the speeds of the primary and secondary pulleys. The signal dependent on the duty ratio Di is applied to the solenoid operated valve 43. Further, the duration of the speed θ higher than a reference level α is computed. The current drop quantity is obtained from the graph of FIG. 4c depending on the period. From this data, the transmission ratio is shifted down depending on the magnitude of the opening speed θ of the throttle valve. The quantity of downshift is increased with an increase of the speed of the throttle valve.

Figure 5A:
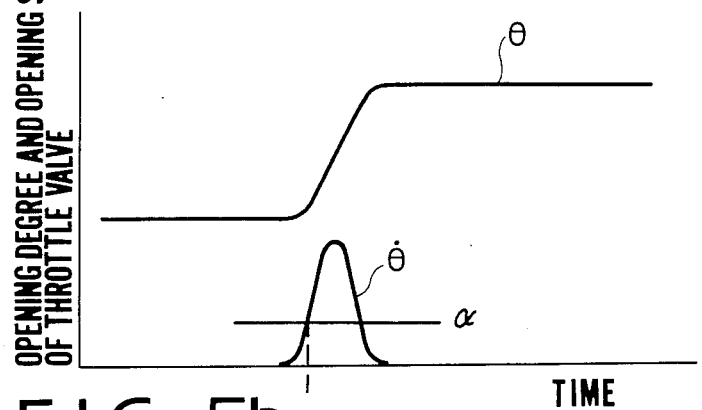
FIGS. 5a to 5d are graphs showing various characteristics.
Figure 5B:
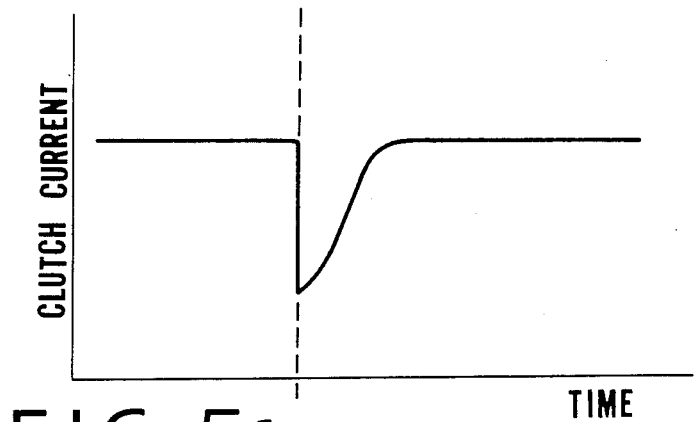
Figure 5C:
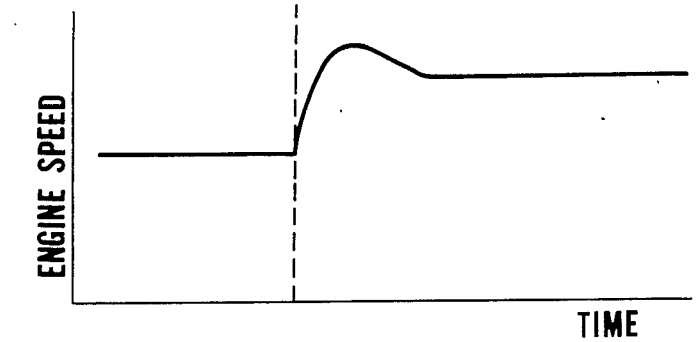
Figure 5D:
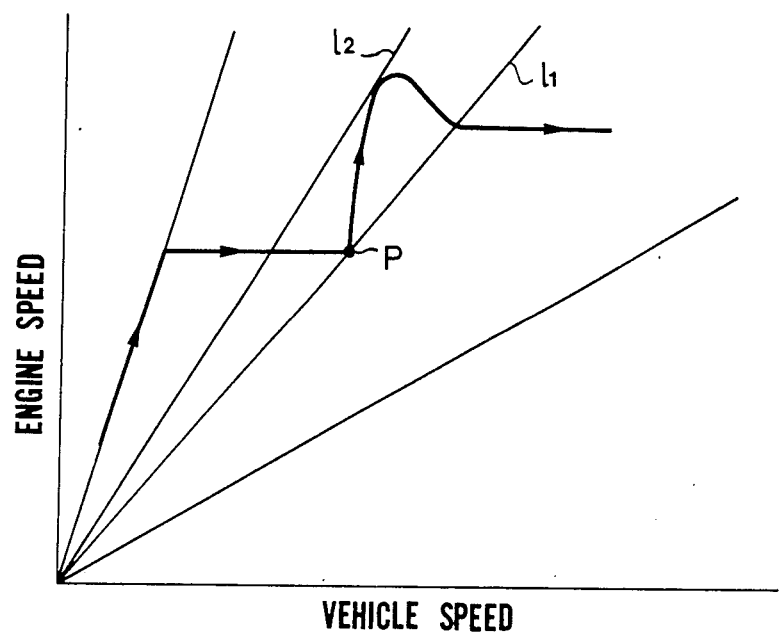

On the other hand, as shown in FIG. 5a, when the speed θ exceeds the reference value α, the current passing through the magnetizing coil 8 decreases as shown in FIG. 5b. Accordingly, the engine speed rapidly increases as shown in FIG. 5c. The rapid increase of the engine speed from a point P in FIG. 5d causes shifting down from a transmission ratio $l_1$ to a transmission ratio $l_2$ depending on the opening degree of the throttle valve.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a system for controlling the transmission ratio of an infinitely variable transmission for an engine mounted on a vehicle, the engine having a throttle valve and an electromagnetic clutch having a coil for transmitting the power of the engine to the transmission, said transmission comprising a primary pulley having a hydraulically shiftable disc and a hydraulic cylinder for operating the disc, a secondary pulley having a hydraulically shiftable disc and a hydraulic cylinder for operating the disc of the secondary pulley, and a belt engaged with both pulleys, the improvement comprising;

a hydraulic circuit having a transmission ratio control valve having an end chamber and a spool moved by control oil supplied to the end chamber for selectively shifting the disc of the primary pulley in the downshift direction and upshift direction, respectively, first passages including a supply passage for supplying oil to the hydraulic cylinder of the primary pulley passing through the transmission ratio control valve and a first drain passage for draining the oil in the hydraulic cylinder of the primary pulley passing through the transmission ratio control valve, a control oil passage for supplying a part of drain oil in the first drain passage as the control oil to the end chamber, and a second drain passage for draining the oil in the end chamber;

said hydraulic circuit including
means comprising a regulator valve provided in the control oil passage for keeping the pressure of the control oil in the control oil passage constant;

first means for detecting conditions of transient acceleration of the vehicle for producing a first signal;

second means responsive to said first signal for producing a control signal representing variation rate of the transient;

said hydraulic circuit including third means including a solenoid operated valve provided in the second drain passage and a solenoid responsive to the control signal for operating the solenoid operated valve to control the amount of oil in the end chamber for shifting said spool of said transmission ratio control valve in the downshift direction, and clutch control means responsive to the control signal for decreasing clutch current passing through the coil of the electromagnetic clutch so as to increase speed of the engine for a period.

2. The system according to claim 1 wherein the first means is a throttle position sensor.

3. The system according to claim 1 wherein the second means is a control unit comprising a microcomputer.

* * * * *